May 16, 1939.  F. MARTINDELL  2,158,827
METHOD OF AND MACHINE FOR WINDING COILS
Filed March 12, 1937   3 Sheets-Sheet 1
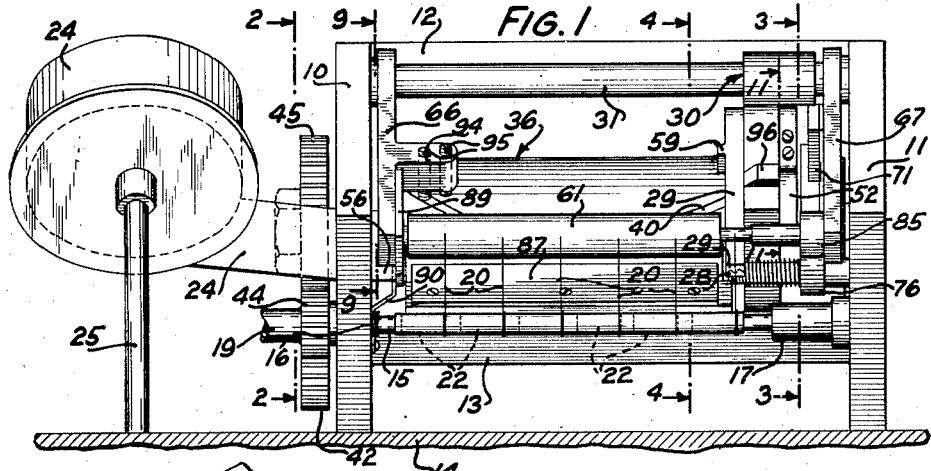
FIG. 1
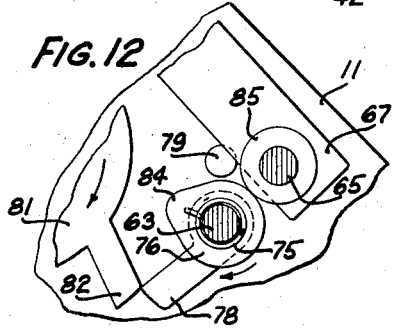
FIG. 12
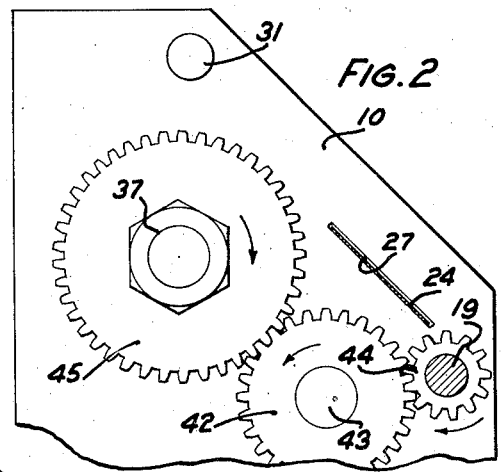
FIG. 2
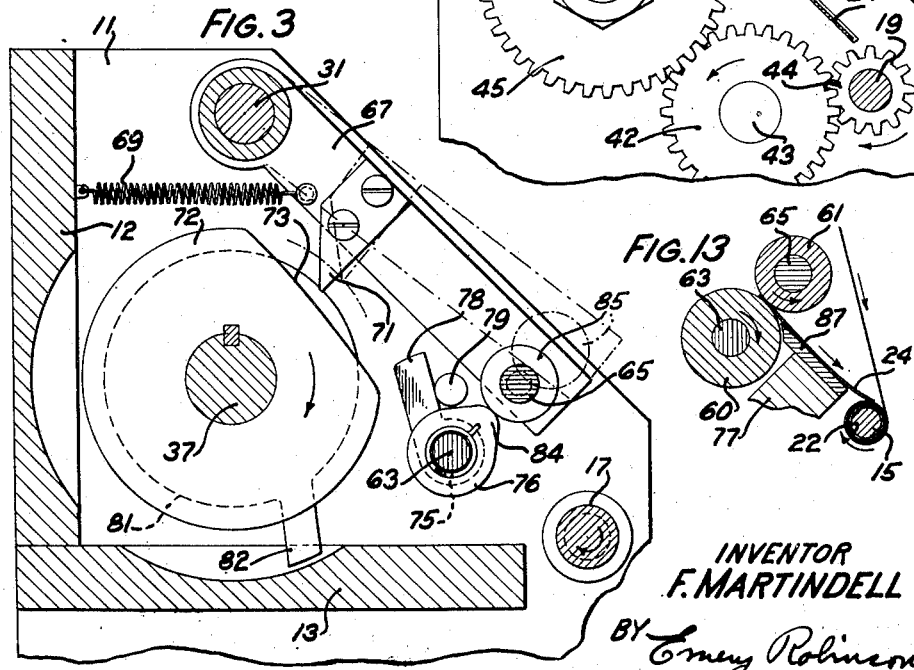
FIG. 3
FIG. 13
INVENTOR
F. MARTINDELL
BY Emery Robinson
ATTORNEY May 16, 1939.   F. MARTINDELL   2,158,827
METHOD OF AND MACHINE FOR WINDING COILS
Filed March 12, 1937   3 Sheets-Sheet 2
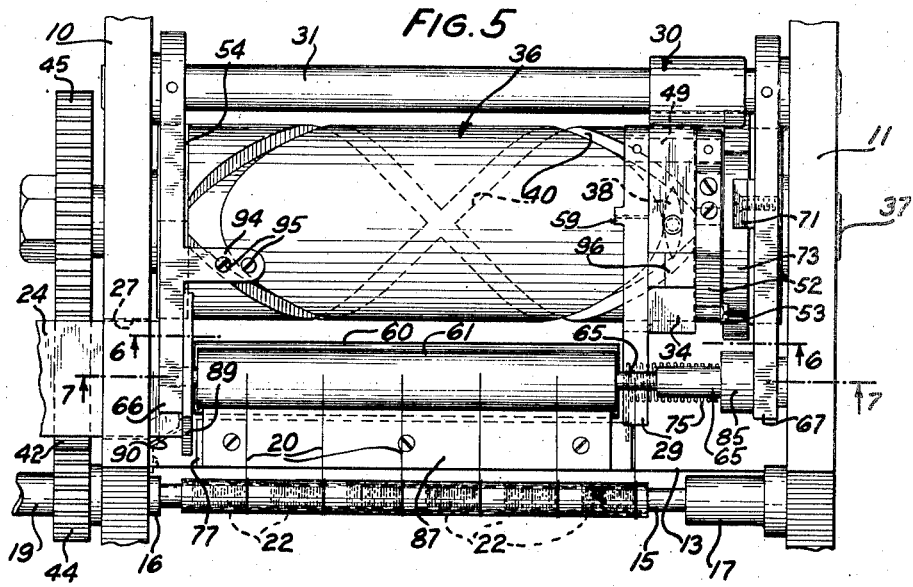
FIG. 5
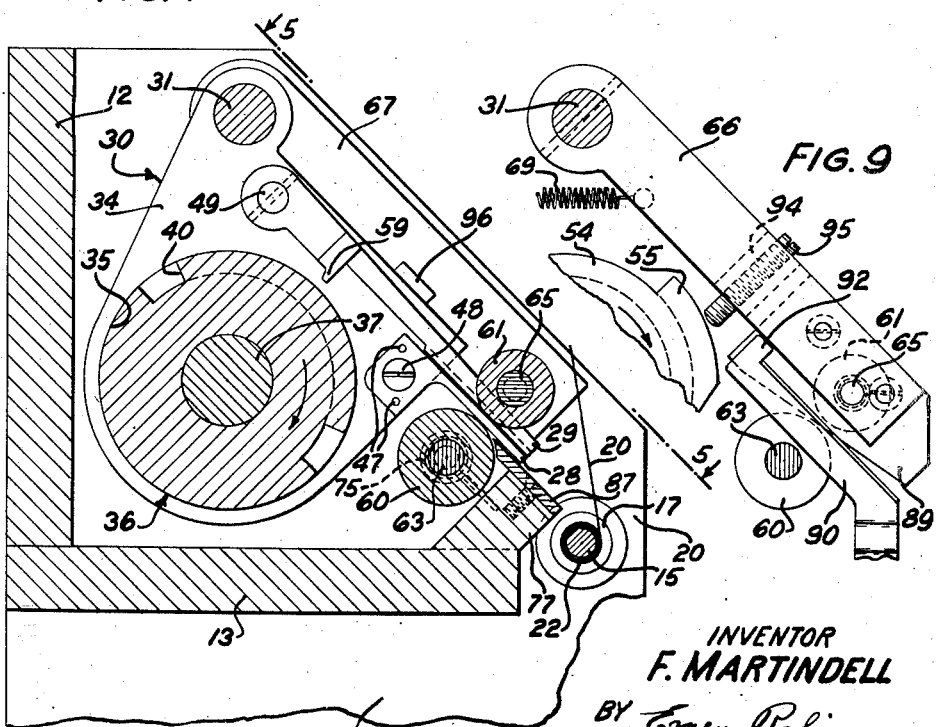
FIG. 4
FIG. 9
INVENTOR
F. MARTINDELL
BY Emery Robinson
ATTORNEY May 16, 1939.  F. MARTINDELL  2,158,827
METHOD OF AND MACHINE FOR WINDING COILS
Filed March 12, 1937   3 Sheets-Sheet 3
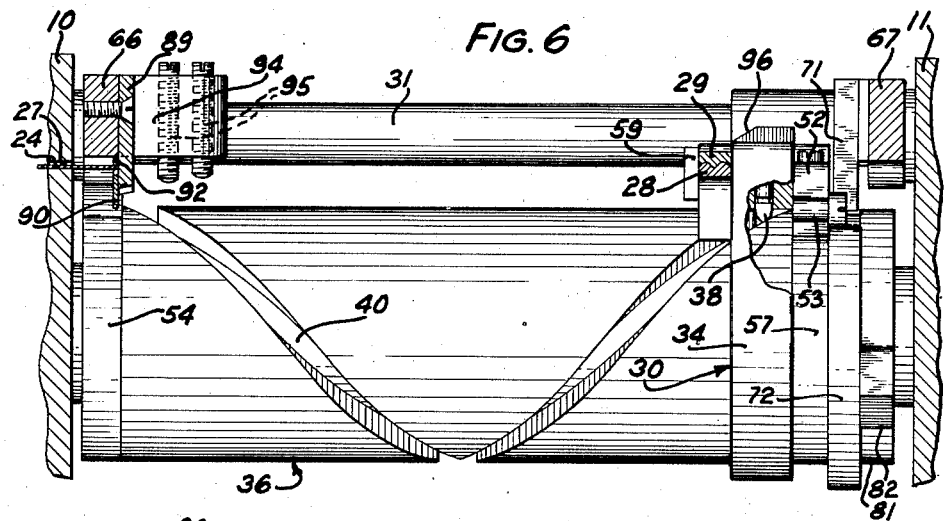
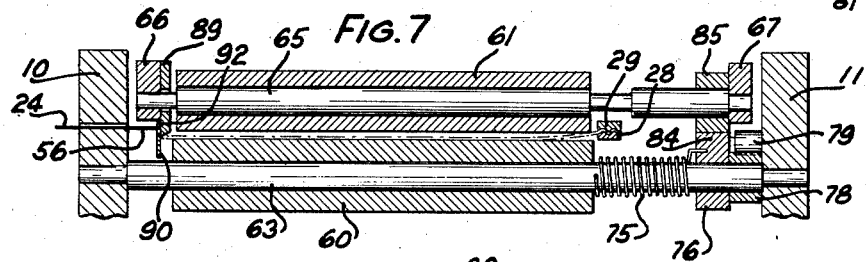
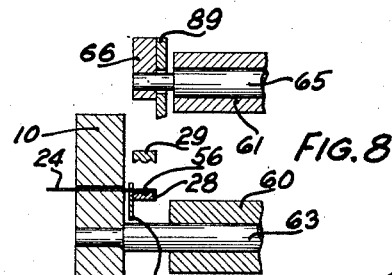
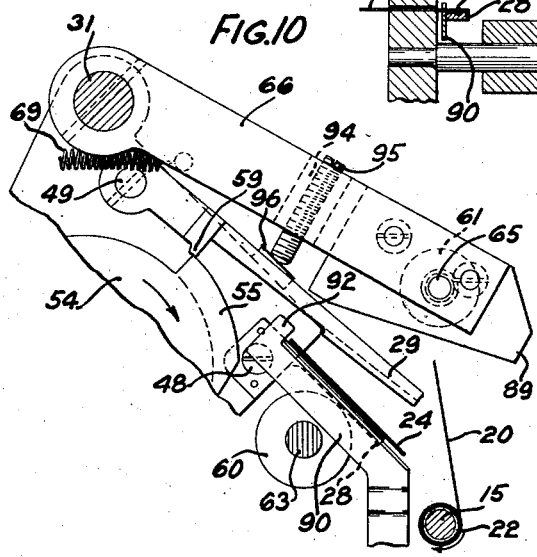
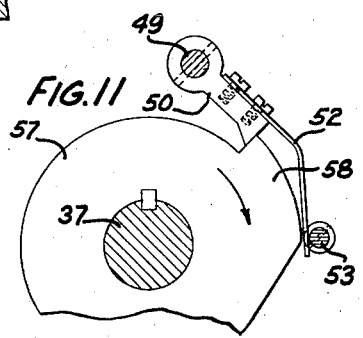
INVENTOR
F. MARTINDELL
BY Emery Robinson
ATTORNEY Patented May 16, 1939

2,158,827

UNITED STATES PATENT OFFICE 2,158,827

METHOD OF AND MACHINE FOR WINDING COILS

Frank Martindell, Western Springs, Ill., assignor to Western Electric Company, Incorporated, New York, N. Y., a corporation of New York Application March 12, 1937, Serial No. 130,473

11 Claims. (Cl. 242—10)

This invention relates to a method of and machine for winding coils, and more particularly to a method of and machine for winding electrical coils of the type in which superimposed layers of wire are separated by strips or sheets of insulating material.

An object of the present invention is to provide a simple, inexpensive and efficient method of and machine for winding electrical coils of the above mentioned type.

In accordance with one embodiment of the invention there is provided a method of and machine for winding such coils, in which the interleaving material, in strip form, is advanced endwise, longitudinally of the coil winding arbor, after which the required length thereof is severed and then inserted edgewise into the coil being wound.

Other features and advantages of the invention will become apparent from the following detailed description when read in conjunction with the accompanying drawings, in which:

Fig. 1 is a front elevational view, partially broken away, of a coil winding machine embodying the invention and by means of which the method of the invention may be practiced;

Fig. 2 is an enlarged fragmentary vertical section on line 2—2 of Fig. 1;

Fig. 3 is an enlarged fragmentary vertical section on line 3—3 of Fig. 1;

Fig. 4 is an enlarged fragmentary vertical section on line 4—4 of Fig. 1;

Fig. 5 is an elevational view looking in the direction indicated by the line 5—5 in Fig. 4;

Fig. 6 is an enlarged fragmentary section taken on line 6—6 of Fig. 5;

Fig. 7 is a fragmentary section on line 7—7 of Fig. 5;

Fig. 8 is a fragmentary section similar to a portion of Fig. 7, but showing the several operating parts in different positions;

Fig. 9 is an enlarged detailed section on line 9—9 of Fig. 1;

Fig. 10 is an enlarged sectional view similar to Fig. 9, but showing the several operating parts in the positions shown in Fig. 8;

Fig. 11 is a fragmentary sectional view on line 11—11 of Fig. 1;

Fig. 12 is a fragmentary section similar to a portion of Fig. 3, but showing the several operating parts in different positions, and Fig. 13 is a fragmentary sectional view showing the paper inserting rollers inserting a severed length of paper into the coils being wound.

Referring now to the drawings, wherein like reference characters designate corresponding parts in the several views, it will be seen that the machine may comprise, for example, a rectangular box-like frame having spaced parallel end walls 10 and 11 rigidly interconnected by a rear wall 12 and a horizontal plate 13. The frame may be mounted on the top 14 of a suitable table, work bench, or the like. Within the forward open portion of the frame a winding arbor 15 is removably carried by suitable chucks 16 and 17 rotatably journalled in the end walls 10 and 11, respectively. The chuck 16 is attached to a shaft 19 which may be driven from any suitable source of power (not shown), whereby the winding arbor may be rotated at the desired speed.

The winding arbor may be of any suitable construction, preferably adapted to have attached thereto at spaced intervals the ends of a plurality of wires 20, 20 leading from a corresponding number of conveniently arranged supply spools (not shown). By means of wire guides (not shown) reciprocated longitudinally of the winding arbor, a series of coils 22, 22 each comprising a plurality of superimposed layers of windings are wound simultaneously upon separated zones of the winding arbor, as shown in Figs. 1 and 5.

Inasmuch as the construction and arrangement of the winding arbor and wire guides form no material part of the present invention, further illustration and description thereof are believed unnecessary.

The present invention is directed primarily to a simple and efficient method of and mechanism for feeding and severing the interleaving material and inserting it between the superimposed layers of windings of the coils while they are being wound. The mechanism comprises an interleaving material supply means, a feeding means for intermittently withdrawing predetermined lengths of the interleaving material from the supply means and advancing it endwise, longitudinally of the winding arbor, a severing means for severing the interleaving material into the required lengths, a means for receiving the severed lengths of the interleaving material from the feeding means and inserting them edgewise into the coils being wound, and means for actuating the several means referred to in timed relation with each other and in synchronism with the winding operation.

The material supply means may comprise, for example, a roll of insulating material 24 (Fig. 1), such as paper or cellulose acetate, in ribbon or strip form, of a width approximately or slightly greater than the circumference of the finished coils. As shown, the paper roll is mounted for rotation on an arbor 25 secured to and projecting upwardly and rearwardly from the table top 14. The end wall 10 of the frame is provided with an inclined slot 27 (Fig. 2) through which the paper strip passes upon being withdrawn from the supply roll by the feeding means hereinafter described. Of course, any suitable mechanism may be employed to prevent overrunning of the supply roll and maintain the paper strip under tension as it is withdrawn from the roll.

The means for intermittently withdrawing predetermined lengths of the paper strip 24 from the supply roll comprises a pair of paper gripping fingers 28 and 29 adapted to be reciprocated longitudinally of the winding arbor 15 in line with the paper guiding slot 27. These fingers are carried by a reciprocatory carriage 30 slidable on a horizontal bar 31 which is rotatably journalled in suitable bearings in the end walls 10 and 11 of the machine frame. The carriage 30 comprises a vertical plate-like portion 34 having a circular aperture 35 (Fig. 4) slidably fitting a cylindrical cam 36. The cam is secured to a horizontal cam shaft 37 rotatably journalled in the end walls 10 and 11 of the machine frame. A follower 38 (Figs. 5 and 6) on the carriage 30 rides in an endless groove 40 formed in the outer surface of cylindrical cam 36. The cam groove is an endless track having two changes of direction, one at each end of the cam, so that the follower 38 traverses the groove as the cam is rotated, whereby the carriage 30 together with the paper gripping fingers 28 and 29 is reciprocated longitudinally of the winding arbor. The cam shaft is driven from the shaft 19 through an intermediate idler gear 42, as best shown in Fig. 2. The idler gear is carried on a stub shaft 43 journalled in the end wall 10 of the machine frame. A gear 44 on shaft 19 drives the idler gear 42 and the latter, in turn, drives a gear 45 fixed to cam shaft 37.

Referring particularly to Fig. 4, it will be seen that the lower paper gripping finger 28 is rigidly attached to the carriage 30 by two pins 47, 47 and a screw 48. The upper finger 29 is pivotally mounted on the carriage, so that its forward end is movable toward and away from the finger 28. Both gripping fingers are mounted on the left side of the carriage (Figs. 5 and 6). The upper finger is attached at its rear end to one end of a pivot pin 49, the opposite end of which projects from the right side of the carriage where a cam lever 50 is attached to it, as best shown in Fig. 11. An angular leaf spring 52 has one end attached to the free end of the cam lever and its opposite end engages the back side of a screw 53 fixed to the carriage. The spring 52 thus serves to urge the forward end of the upper gripping finger toward the lower gripping finger.

Secured to the cam shaft 37 adjacent the left end of cylindrical cam 36 is a disc-like cam 54 having a peripheral wedge-like projection 55 (Fig. 9). Another disc-like cam 57 having a peripheral projection 58 (Fig. 11) similar to cam 54 is secured to the cam shaft adjacent the right end of the cylindrical cam. The cam projection 55 cooperates with a depending lug 59 (Figs. 4 and 10) on the upper paper gripping finger 29 to momentarily open or separate the paper gripping fingers as they approach the end of their movement toward the left, and cam projection 58 cooperates with the cam lever 50 (Fig. 11) to momentarily open the paper gripping fingers as they approach the end of their movement toward the right. It will be obvious, therefore, that the paper gripping fingers are caused to receive and grip the extended end portion 56 of the paper strip and advance the strip endwise, longitudinally of the winding arbor; and at the end of their movement toward the right, the fingers are opened to release the paper strip. In order to insure a tight gripping of the paper strip, the paper engaging portions of the gripping fingers are preferably formed with internesting serrations, as shown in Figs. 6, 7 and 8.

The means for inserting the paper strip into the coils being wound comprises a pair of horizontal rollers 60 and 61 arranged parallel to the winding arbor. These rollers are preferably formed of rubber or the like and are of a length corresponding to the length of the paper strips to be introduced into the coils being wound. The lower roller 60 is attached to a shaft 63 which is rotatably journalled at opposite ends in the end walls 10 and 11, respectively, of the machine frame. By referring to the drawings, it will be seen that the lower roller 60 is positioned just below the lower paper gripping finger 28 so that the latter is adapted to travel along the upper surface of the lower roller.

The upper roller 61 is carried by a shaft 65 which is journalled at opposite ends in the forward ends of pivotal arms 66 and 67, respectively, whereby the upper roller is movable toward and away from the lower roller. At their rear ends the arms 66 and 67 are secured to the bar 31, which is rotatable in the frame as described above. Each of the arms has one end of a coil spring 69 attached to it intermediate its ends (Figs. 3, 9 and 10), and the opposite ends of the coil springs are attached to the rear wall 12 of the machine frame. The upper roller is thereby urged downwardly toward the lower roller.

Attached to the upper roller carrying arm 67 intermediate its ends and depending therefrom is a lug or cam follower 71 (Fig. 3) adapted to be engaged by a disc-like cam 72 secured to cam shaft 37 adjacent the cam 57 (Fig. 6). This cam serves to separate the spring pressed upper roller 61 from the lower roller 60 so as to permit free passage of the paper gripping fingers between the rollers. The cam is substantially circular, but has a flat portion 73 (Fig. 3) designed and arranged so that the cam is ineffective when the paper feeding fingers are at the right hand end of their travel, as shown in Fig. 7.

A torsion spring 75 on the left end portion of the lower roller shaft 63 serves to rotate the lower roller in a clockwise direction (Fig. 4). One end of the spring is attached to a collar 76 keyed to the roller shaft and the opposite end of the spring is attached to an upwardly inclined ridge 77 on the forward edge of the horizontal plate 13 of the machine frame. Rotation of the lower roller under the force of the spring is limited by the engagement of a stop finger 78 on roller shaft 63 with a stop pin 79 on the end wall 11 of the machine frame, as best shown in Fig. 3.

Secured to the cam shaft 37 adjacent the cam 72 is a disc-like cam 81 (Figs. 3 and 6) which has a peripheral lug or projection 82. While the paper gripping fingers are approaching the end of their movement toward the right, the cam projection 82 engages the finger 78 on the lower roller shaft and cooperates therewith to rotate the lower roller in a counterclockwise direction (Fig. 3). This winds the spring 75 so that it is effective, when the cam projection 82 releases the finger 78, to rotate the lower roller in a clockwise direction until the finger engages the stop pin 79. Fig. 12 shows the relative positions of the parts just described after the spring has been wound and is about to be released. Although the lower roller actually makes less than one complete revolution, it is sufficient for inserting the forward edge of the paper strip into the bight between the coils being wound and the supply wires leading thereto, after which the paper strip is wrapped around the coils by the wires.

Substantially simultaneously with the grasping of the paper strip by the coils being wound, the rollers 60 and 61 are separated slightly to release the paper strip. This is accomplished by causing the upper roller to be elevated slightly at the proper time by the engagement of a peripheral cam projection 84 on collar 76 (Fig. 3) with the periphery of a collar 85 on upper roller shaft 65.

An inclined shelf 87 is provided between the paper inserting rollers and the winding arbor for guiding the paper strip into the coils being wound. As shown, this shelf may be secured to the forwardly inclined upstanding ridge 77 of the machine frame. The top surface of the shelf is substantially tangential to both the lower roller and the winding arbor.

The severing means for cutting the paper strip into the required lengths comprises a pair of cooperating knives 89 and 90. The upper knife 89 is secured to the forward end of the roller carrying arm 66 so that it is moved up and down with the upper roller 61. The lower knife 90 is of resilient steel and of angular form, and is secured at its lower end to the end wall 10 of the machine frame, as best shown in Fig. 1. It will be noted that the lower knife has an inclined cutting edge over which the paper strip is fed. Due to the resiliency of the lower knife and the manner in which it is mounted, the cutting portion thereof resiliently bears against the left side of the upper knife 89 during the cutting operation, thereby insuring a clean cut. An upstanding projection 92 at the rear upper end of the lower knife remains in contact with the left side of the upper knife at all times, thus maintaining the knives in cutting alignment.

In order that the paper gripping and feeding fingers 28 and 29 may receive and grip the extended end 56 of the paper strip, they are moved toward the left beyond the normal position of the lower knife, as will be apparent from Figs. 7 and 8. The cutting portion of the lower knife is thus deflected by the lower finger 28 to the position shown in Fig. 8, whereby the end of the paper strip is exposed for gripping engagement by the fingers.

The roller carrying arm 66 which carries the upper knife 89 has a transverse arm or bracket 94 (Figs. 5 and 6) secured thereto or integral therewith. Two screws 95, 95 are adjustable in the bracket 94 and have rounded end portions which project from the underside of the bracket and are adapted to be engaged by an inclined cam surface 96 on the paper gripping finger carriage 30 as the latter approaches the end of its movement toward the left. The cam surface 96 cooperates with the screws 95 to raise the arm 66 together with the upper knife 89 sufficiently so that the knife will not obstruct the movement of the paper gripping fingers to the extreme left end position shown in Fig. 8.

It is believed that the operation of the machine will be clearly understood from the following brief description of the operation of the several mechanisms above referred to. After the ends of the supply wires have been suitably attached to the winding arbor at separated positions thereon, a sheet of paper is wrapped around the arbor to provide an inner liner for the coils. Power is then applied for rotating the shaft 19 from which the winding arbor and cam shaft 37 are driven. At the same time, the reciprocatory movement of the wire guides (not shown) is started. The extent of movement of the wire guides in either direction will, of course, depend upon the length of the coils to be wound and the ratio between the speed of the winding arbor and the speed of movement of the wire guides will depend upon the number of turns per layer of windings. In any case, however, the cam shaft 37 should make two complete revolutions for each layer of windings, so that one cycle of operation of the paper feeding mechanism is completed for each layer of windings. The cam shaft and the wire guides are driven in timed relation so that the paper gripping and feeding fingers 28 and 29 are at their extreme right hand end position at the start of each layer of windings.

At the start of each layer of windings the several operating parts of the paper feeding mechanism assume the positions in which they are shown in Figs. 1 to 7, inclusive, and Fig. 9 of the drawings. As illustrated in these figures, a strip of paper has just been inserted into the coils and wrapped around the layer of windings just completed. As the winding of the new layer of wire proceeds, the upper roller 61 is raised and held separated from the lower roller 60 by the cam 72, as shown in dotted outline in Fig. 3. The paper gripping and feeding fingers 28 and 29, which are now closed, are moved toward the left, between the separated rollers, by cylindrical cam 36. Before reaching the end of their movement toward the left the fingers are opened by the cam 54, as shown in Fig. 10, and the upper knife 89 is elevated by cam surface 96, as described above, so as not to obstruct the movement of the open fingers to the position shown in Fig. 8. In moving to this position, the fingers deflect the lower knife 90 toward the left, as described above. The extended end portion 56 of the paper strip is now loosely straddled by the feed fingers. Just before the feed fingers start moving toward the right, cam projection 55 of cam disk 54 moves out of operative relation with respect to the cam follower portion 59 of the upper finger 29, thereby permitting the fingers to grip the paper strip under the pressure of the spring 52. The fingers are then moved toward the right, advancing the paper strip endwise, longitudinally of the winding arbor and between the upper and lower rollers 60 and 61, respectively. In Fig. 7 the fingers are shown at the end of their movement toward the right and the advanced portion of the paper strip is shown in dotted lines.

During the movement of the feed fingers toward the right the upper roller is held separated from the lower roller, first by the engagement of the cam surface 96 with the screws 95 and then by the engagement of the circular portion of cam 72 with the cam follower 71. As the fingers approach the end of their movement toward the right, projection 82 on cam 81 cooperates with finger 78 on lower roller shaft 63 to wind the spring 75. The cam projection 84 on collar 76 is at the same time rotated out of roller separating position and the flat portion 73 of cam 72 now permits the upper roller to drop into clamping engagement with the paper strip under the pressure of the springs 69. At the same time, the upper knife 89, in moving downwardly with the upper roller, cooperates with the lower knife to sever the advanced portion of the paper strip.

The severed paper is now clamped between the upper and lower rollers ready to be inserted into the coils. Immediately after the paper strip is gripped by the rollers, the feed fingers are opened to release the strip by the engagement of cam projection 68 of cam 57 with cam lever 58 on the upper feed finger. Upon the completion of the layer of windings being wound, cam projection 82 releases finger 78, whereupon the previously wound spring 75 rotates the lower roller to insert the paper strip edgewise into the coils. The cam projection 84 separates the rollers slightly to release the paper strip as soon as the same is grasped by the coils, as explained above. This completes one cycle of operation of the paper feeding mechanism, which is repeated once for each layer of windings. Obviously, the cam groove 40 is so designed that the feed fingers dwell for a short time at the ends of their movements in either direction in order to permit the performance of the several operations above described.

After the desired number of layers of windings have been wound, the wires are severed, the winding arbor is removed and the "stick" of coils is removed from the arbor and may be separated into individual coils in a manner well known in the art. After the winding arbor has been replaced in the machine and the ends of the supply wires have been attached hereto, as mentioned above, the machine is ready to wind another "stick" of coils.

It should be understood that the invention is not limited to the illustrative embodiment thereof herein disclosed, except as defined by the appended claims.

What is claimed is:

1. The method of feeding sheet material to a coil being wound, which comprises withdrawing the material from a supply thereof, advancing it endwise, longitudinally of the coil, severing a predetermined length of the withdrawn material from the supply, and then inserting the severed length edgewise into the coil.

2. In a winding machine, a winding arbor, means for winding successive layers of strand material upon the arbor, a sheet material supply roll, means for withdrawing sheet material from the supply roll and for advancing it endwise, longitudinally of the winding arbor, means for severing a predetermined length of the withdrawn material, and means for feeding the severed length edgewise toward the arbor and between the successive layers of the strand material.

3. In a winding machine, a winding arbor, means for rotating the arbor to wind material thereon, a sheet material supply means, means for receiving and gripping an end portion of the material from the supply means, means for moving the gripping means to advance the material endwise, longitudinally of the arbor, means for severing a portion of the advanced material from the supply, and means for feeding the severed portion edgewise toward the arbor.

4. In a winding machine, a supporting frame, a winding arbor rotatably mounted therein, a strip material supply roll mounted for rotation about an axis transverse with respect to the axis of rotation of the arbor, means for withdrawing strip material from said supply roll and for advancing it endwise, longitudinally of the winding arbor, means for severing a portion of the advanced material, and means for feeding the severed portion edgewise toward the winding arbor.

5. In a winding machine, a winding arbor, a roller for feeding material to be wound toward the arbor, a spring for rotating the roller in one direction and disengageable means for rotating the roller in the opposite direction.

6. In a winding machine, a winding arbor, means for rotating the arbor to wind material thereon, a roller for feeding the material toward the arbor, a shaft supporting the roller, a coil spring on the shaft for rotating the roller in one direction, stop means limiting the rotation of the roller in said direction, disengageable means for rotating the roller in the opposite direction, and means operated in timed relation with the winding arbor for actuating the disengageable means.

7. In a winding machine, a winding arbor, a pair of cooperating rollers parallel to the arbor, means for advancing sheet material endwise, longitudinally of the arbor and between said rollers, means for pressing the rollers into clamping engagement with the material, and means for rotating one of said rollers to feed the material edgewise toward the arbor.

8. In a winding machine, a winding arbor, a pair of rollers disposed parallel to the arbor, yieldable means urging the rollers toward each other, spring means for rotating one of the rollers in one direction, stop means limiting said rotation, means for rotating said roller in the opposite direction to energize the spring means, and means rendered effective automatically after a predetermined rotation of said roller under the force of the spring means for separating said rollers against the opposing force of the yieldable means.

9. In a winding machine, a winding arbor, strip material feeding means mounted for movement longitudinally of the arbor, and means for holding an end portion of strip material in an extended position along the path of movement of said feeding means.

10. In a winding machine, a winding arbor, a sheet material supply roll, means for holding an end portion of the sheet material in an extended position in a plane parallel to the winding arbor, and means reciprocable longitudinally of the arbor for gripping said extended end portion and advancing it longitudinally of the arbor.

11. The method of winding coils, which comprises winding strand material in superimposed layers upon a winding arbor, withdrawing strip material from a supply thereof and advancing it endwise, longitudinally of the axis of the coil being wound, severing a portion of predetermined length from the strip material withdrawn from the supply, and then inserting the severed portion edgewise between superimposed layers of windings of the coil being wound.

FRANK MARTINDELL.